United States Patent
Saptharishi et al.

(10) Patent No.: US 10,543,931 B2
(45) Date of Patent: Jan. 28, 2020

(54) METHOD AND SYSTEM FOR CONTEXTUALLY CONCATENATING DISPLAY, AURAL, AND VOICE ALERTS

(71) Applicant: HONEYWELL INTERNATIONAL INC., Morris Plains, NJ (US)

(72) Inventors: Hariharan Saptharishi, Trichy (IN); Mohan Gowda Chandrashekarappa, Bangalore (IN); Narayanan Srinivasan, Chennai (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/790,819

(22) Filed: Oct. 23, 2017

(65) Prior Publication Data
US 2019/0118964 A1    Apr. 25, 2019

(51) Int. Cl.
| G06F 17/28 | (2006.01) |
| B64D 45/00 | (2006.01) |
| G08G 5/00 | (2006.01) |
| G10L 15/26 | (2006.01) |
| H04L 12/58 | (2006.01) |

(52) U.S. Cl.
CPC ............. *B64D 45/00* (2013.01); *G06F 17/28* (2013.01); *G08G 5/0021* (2013.01); *G10L 15/265* (2013.01); *H04L 51/16* (2013.01)

(58) Field of Classification Search
CPC ....................................................... H04L 51/16
See application file for complete search history.

(56) References Cited

U.S. PATENT DOCUMENTS

| 7,809,405 | B1 | 10/2010 | Rand et al. |
| 8,164,487 | B1 | 4/2012 | Tsai |
| 8,532,844 | B2 | 9/2013 | Wilson et al. |
| 9,230,549 | B1 | 1/2016 | Popik et al. |
| 9,666,178 | B2 | 5/2017 | Loubiere et al. |
| 2008/0153529 | A1 | 6/2008 | O'Neill et al. |
| 2009/0251542 | A1 | 10/2009 | Cohen et al. |
| 2013/0346081 | A1* | 12/2013 | Loubiere .............. G08G 5/0013 704/260 |

(Continued)

OTHER PUBLICATIONS

Alexandria, "Medical Dictation Solutions—Which One is Best?", Speakeasy Solutions, Oct. 19, 2010.*

(Continued)

*Primary Examiner* — Feng-Tzer Tzeng
(74) *Attorney, Agent, or Firm* — Lorenz & Kopf, LLP

(57) ABSTRACT

A method and system of monitoring aural and message alerts received during flight in an internet of things (IOT) cockpit of an aircraft generated by systems within the cockpit, the method includes: receiving a plurality of alerts which include at least one of an aural alert or message alert; applying a first natural language processing (NLP) process to the aural alert to convert the aural alert to a text alert consistent in structure with the message alert for aggregating together with the message alert to form a concatenated message alert; and identifying the context of the concatenated message alert by applying a second NLP process to the concatenated message alert in its entirety and subsequent tagging the concatenated message alert to associate a tagged message with a display element wherein the tagged message is a concatenated message.

20 Claims, 7 Drawing Sheets

(56) References Cited

U.S. PATENT DOCUMENTS

| | | | |
|---|---|---|---|
| 2015/0081292 A1* | 3/2015 | Populus | G08G 5/0013 704/235 |
| 2015/0162001 A1 | 6/2015 | Kar et al. | |
| 2016/0065519 A1* | 3/2016 | Waltermann | H04L 51/16 709/206 |
| 2016/0155435 A1* | 6/2016 | Mohideen | G08G 5/0013 704/235 |

OTHER PUBLICATIONS

Alexandria, "Speakeasy Solutions: Medical Dictation Solutions—Which One is Best?" Oct. 19, 2010. (Year: 2010).*

* cited by examiner

METHOD AND SYSTEM FOR CONTEXTUALLY CONCATENATING DISPLAY, AURAL, AND VOICE ALERTS

TECHNICAL FIELD

The present invention generally relates to alerts with a cockpit display and more particularly to a method and system for contextually concatenating display, aural and voice alerts in a cockpit display system.

BACKGROUND

With increases in air traffic resulting in more aircrafts departing and arriving at airports, there is also an associated increase in communications between the aircrafts, and between the aircrafts and ground controllers to ensure smooth operations, efficiency and safety of the air traffic in the air and on the ground. To meet such greater demands, particularly on safety and efficiency, the pilot during a flight is kept appraised of any anomalies or relevant flight information by the aid of related messages and alerts on different systems. These alerts or messages may occur when certain conditions are detected by various aircraft systems or when the ground air traffic controller or airline operations send relevant information via a communication channel to the aircraft. The messages and alerts issued could be displayed using intuitive techniques on a display system, or could be aurally voiced over an audio channel by ground controllers or airline operations, or could be the communications between the cockpit crew. In addition, different cockpit systems may be used to independently evaluate specific conditions for messages to be displayed or aurally voiced.

While the system may display or aurally voice such information, such system fails to or does not collate the message or aural alert, and does not display the information from these multiple sources prior to any display on the cockpit display by making determinations or evaluations of the applicability of a specific message. In addition, the system does not identify conflicting system alerts, advisories or information. The onus of making such evaluations, identifications, and determinations therefore falls on the pilot or flight crew and their ability to aggregate information referenced from multiple systems, to use this information to formulate a complete picture of a particular situation, and to judiciously identify conflicts, to adhere, in instances, to specific system advisories.

Hence, it is desirable to address these inadequacies raised in the comprehension of the message and aural alerts received by the pilot with an improved alert system and method that allows for concatenating messages and alerts from different systems of both display and aural based on the context of the flight and present to the pilot an integrated view of the various related messages and alerts. The present disclosure addresses at least this need.

BRIEF SUMMARY

A method and system for concatenating display, aural and text messages and alerts that correspond to the same context is described that can recognize related aural, text messages and/or annunciations, and present the alert information to the pilot in a contextual way which increases the likelihood the pilot understands a complete viewpoint of a particular situation related to the received alerts.

In an exemplary embodiment, A method of monitoring aural and message alerts received during flight in an internet of things (IOT) cockpit of an aircraft generated by systems within the cockpit, the method including: receiving a plurality of alerts which comprise at least one of an aural alert or message alert wherein the aural and message alerts are from entities including: internal systems of the aircraft, air traffic control (ATC) communications, and internal and external communications of the aircraft; applying a first natural language processing (NLP) process to the aural alert to convert the aural alert to a text alert consistent in structure with the message alert for aggregating together with the message alert to form a concatenated message alert wherein the NLP is applied with context based attributes to determine at least a context of the aural alert by matching with a set of context attributes prior derived for the particular aircraft and stored locally therein; and identifying the context of the concatenated message alert by applying a second NLP process to the concatenated message alert in its entirety and subsequent tagging the concatenated message alert to associate a tagged message with a display element by matching the context of the concatenated message derived by the second NLP process by a tag of the tagged message with a particular display element from a plurality of display elements wherein the tagged message is a concatenated message.

In another exemplary embodiment, a cockpit display system for use onboard an aircraft, the cockpit display system including: a source of sensatory and message alerts; a processor, communicatively coupled the source of sensatory and message alerts, and a cockpit display, the processor configured to process the sensatory and message alerts to: receive a plurality of alerts which comprise at least one of a sensatory alert or message alert wherein the sensatory and message alerts are either from internal systems of the aircraft, from internal communications, or from external communications; apply a first natural language processing (NLP) process to the sensatory alert to convert the sensatory alert to a text alert consistent in structure with the message alert for aggregating together with the message alert to form a concatenated message alert wherein the NLP is applied with context based attributes to determine at least a context of the sensatory alert by matching with a set of context attributes prior derived for the particular aircraft and stored locally therein; and determine the context of the concatenated message alert by applying a second NLP process to the concatenated message alert in its entirety and subsequent tagging the concatenated message alert to associate a tagged message with a display element by matching the context of the concatenated message derived by the second NLP process by a tag of the tagged message with a particular display element from a plurality of display elements wherein the tagged message is a concatenated message.

In an embodiment, a cockpit display system for use onboard an aircraft, the cockpit display system including: a source of sensatory and message alerts; a processor, communicatively coupled the source of sensatory and message alerts, and a cockpit display, the processor configured to process the sensatory and message alerts to: receive a plurality of alerts which include at least one of a sensatory alert or message alert wherein the sensatory and message alert are either from internal systems of the aircraft or from air traffic control (ATC) communications; apply a first natural language processing (NLP) process to the sensatory data alert to convert the sensatory alert to a text alert consistent in structure with the message alert for aggregating together with the message alert to form a concatenated message alert type wherein the NLP is applied with context based attributes to determine at least a context of the sensatory alert by matching with a set of context attributes prior derived for the particular aircraft and stored locally therein; and determine the context of the concatenated message alert by applying a second NLP process to the concatenated message alert in its entirety and subsequent tagging the concatenated message alert to associate a tagged message with a display element by matching the context of the concatenated message derived by the second NLP process by a tag of the tagged message with a particular display element from a plurality of display elements wherein the tagged message is a concatenated message.

In yet another exemplary embodiment, a method for presenting information on a display system for use onboard an aircraft, the method including: receiving, from a source of aircraft flight alerts; and at a processor, communicatively coupled the source of aircraft flight alerts, and a display device, the processor configured to process aircraft flight alerts to receive a plurality of flight alerts which comprise at least one of a set of an aural alert, an annunciation alert, or a message alert wherein aural, annunciation and message alerts are either from internal systems of the aircraft, from internal communications or from external communications, the processor further comprising a speech recognition processor to: apply a first natural language processing (NLP) process to the aural alert to convert the aural alert or annunciation alert to a text alert consistent in structure with the message alert for aggregating together with the message alert to form a concatenated message alert wherein the NLP is applied with context based attributes to determine at least a context of the aural or annunciation alert by matching with a set of context attributes prior derived for the particular aircraft and stored locally therein; and to determine the context of the concatenated message alert by applying a second NLP process to the concatenated message alert and subsequent tagging the concatenated message alert to associate a tagged message with a display element by matching the context of the concatenated message derived by the second NLP process by a tag of the tagged message with a particular display element from a plurality of display elements wherein the tagged message is a concatenated message.

This summary is provided to describe select concepts in a simplified form that are further described in the Detailed Description. This summary is not intended to identify key or essential features of the claimed subject matter, nor is it intended to be used as an aid in determining the scope of the claimed subject matter.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
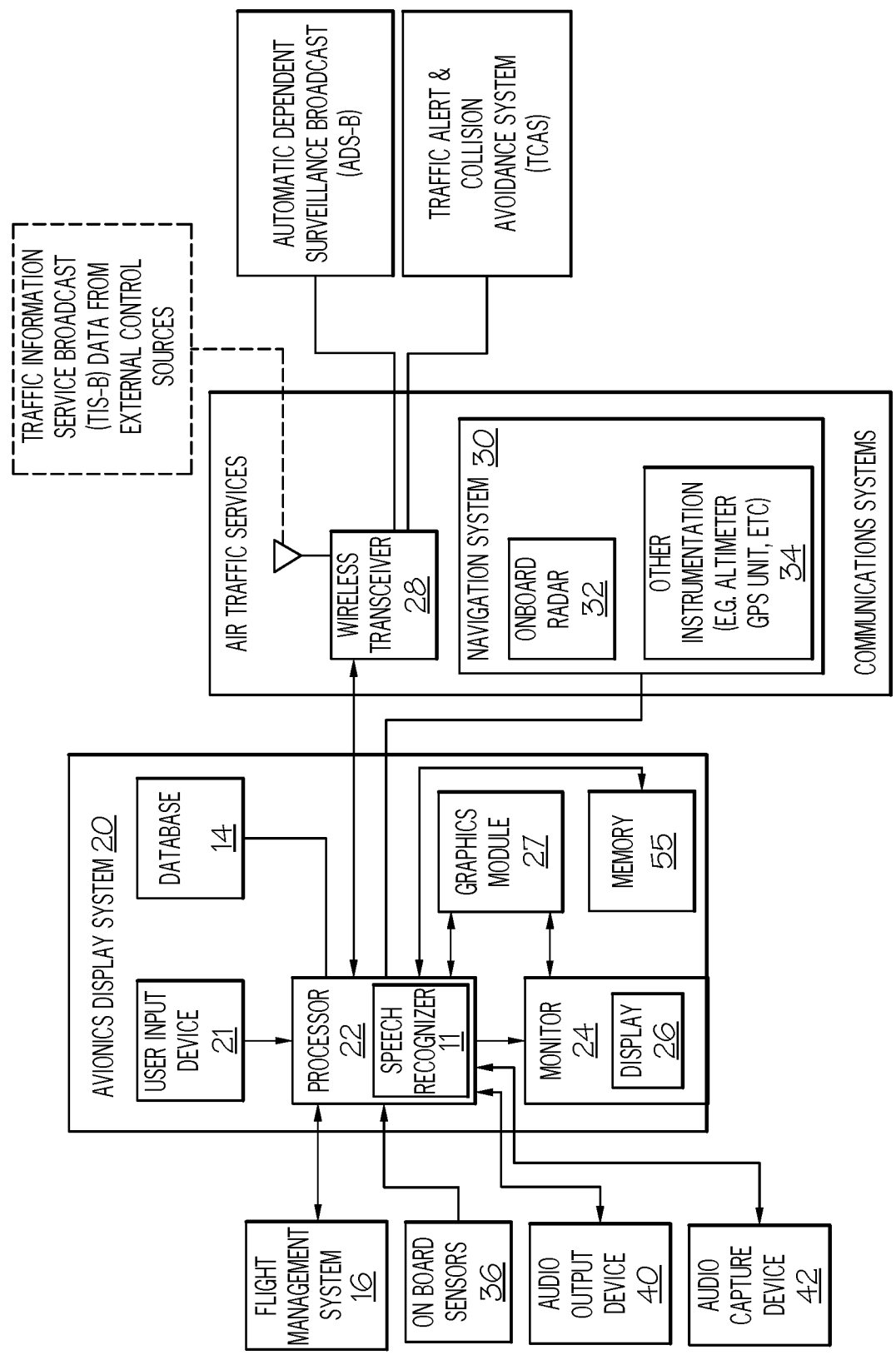
FIG. 1 is a block diagram of a system suitable for use in an aircraft in accordance with the exemplary embodiments described herein.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All the embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, brief summary, or the following detailed description.

While the exemplary embodiments described herein refer to displaying the information on aircraft, the invention may also be applied to other vehicle display systems such as displays used by off-site controllers, e.g., ground controllers or even other vehicular display and alerting systems like automobiles etc. Also, the message display and aural alerts are only used as exemplary embodiments in which an annunciation is made to a pilot. However, it is contemplated that other different modal annunciations including but not restricted to differentially colored or formatted visualization of the data presented, annunciation through lights, vibratory annunciations, haptic feedback and gestures etc. may be used.

The increasing automation of information places a greater burden on the flight crew to obtain and interpret information pertinent to an aircraft. Also, with these increased burdens there may be a resultant increase in human errors due to a number of factors which include: non-coordinated cockpit system messages, poor external visibility, fatigue, lack of position awareness, misunderstood ATC clearances, multiple or conflicting ATC clearances, or inadvertent flight deck distractions still occur leading to accidents and hull loss. Hence, accidents and near miss scenarios due to conflicting instructions or clearances are not uncommon and are or may be evidenced almost every day in aircraft operations. That is, because of these factors, the pilot or flight crew cannot or may not derive a complete picture when receiving a set of non-sequence elements and may not properly combine a set of received and displayed messages or aural alerts from sources of several systems in a proper coherent manner for understanding of a particular situation.

While communications are referenced with respect to ATC communications, it is contemplated that such communications are not limited to ATC communications but to a variety of ground controller communications between the aircraft and the ground controller as well between aircraft to aircraft including aeronautical operations control ("AOC"). In addition, Also, the references to message displays and aural alerts are used as exemplary embodiments in which an annunciation is made to a pilot. However, the use of such examples should not be construed to restrict other different modal annunciations including but not limited to differentially colored or formatted visualizations of data presented, annunciation formed from light and vibratory annunciations as well as gestures etc.

The Next Generation (NextGen) overhaul of the United States airspace system and the companion Single European Sky ATM Research (SESAR) overhaul of the European airspace system creates various trajectory-based mechanisms to improve air traffic management on these continents. That is, electronic instrumentation displays continue to advance in sophistication, achieving increasingly higher levels of information density and, consequently, presenting a greater amount of visual information to be perceived and understood by the operator, e.g., the pilot. It is important that visual displays provide a proper cognitive mapping between what the operator is trying to achieve and the information available to accomplish the task.

In addition, electronic flight bag (EFB) solutions, which include electronic display systems for the flight deck or cabin crew member use, are gaining in popularity. For example, EFB devices can display a variety of aviation data or perform basic calculations (e.g., performance data, fuel calculations, takeoff and landing computations, etc.). In the past, some of these functions had to be manually entered using paper references or were based on data provided to the flight crew by an airline's flight dispatch function. Hence, EFB solutions when displayed add to burdens of interpreting displayed information placed on flight crews. However, integration of accurate ATC instructions and other information displays such as moving maps and electronic charts, is lacking Therefore, in response to potential information overloads or disparate analysis of information received, the advanced connected cockpit environment of an the IOT connected cockpit can enable autonomous systems which allow for or assist in the monitoring of related current cockpit system aural and message alerts and can allow for an intelligent concatenation of the aural alerts or ATC/AOC voice transcribed data into their corresponding contextual display system messages as desired to achieve conflict resolutions and improve overall aircraft safety and performance. Also, one should appreciate that, the concatenated message may be annunciated either by displaying it on a related display system or played back to the pilot as an aural alert or any other relevant mode of annunciation may be chosen based on the context of the message, the flight phase and human factors considerations.

Therefore, it is desirable for the method and system to monitor the current cockpit aural messages or advisories, determine the nature of the aural messages, see if a context concatenation can be done, identify the context message, convert the context to an alert message and tag it to an existing display or graphical element and provide symbology to replay the alert message as an aural alert along with the concatenated message. Such a system will increase pilot efficiency, situational awareness and improve safe terminal area operations by automatically processing the transcribed voice instructions and system aural alerts from multiple sources and identify the relevant instructions affecting the aircraft. The system will utilize all the benefits of voice communications, aural and display alerts, voice transcription and offer pilots with the relevant and intuitive instructions about possible conflicts or incursion threats for safe and continued flight mission execution.

In an exemplary embodiment, in an incident where an aircraft in taxi comes in conflict with another aircraft which has been cleared to land. This incident may have resulted because either of the aircrafts were unaware of the status of the other aircraft. For example, in a particular instance, an aircraft, designated aircraft "A", may have misunderstood the direction of a taxi out clearance at a particular airport and began to enter the same runway on which another aircraft, for example a designated aircraft "B", which had been given a valid landing clearance but was not communicating on the same control tower ("TWR") frequency. This other aircraft, the aircraft "B" is or was about to proceed with a touch down maneuver from an approach in an opposing direction of use or opposing end of a runway. On the viewing of the aircraft "A", which had stopped with the nose of the aircraft protruding onto the runway, the aircraft "B" applied maximum manual braking and stopped just before reaching the aircraft "A". In other words, because of the air traffic control ("ATC") and airport procedures as well as the aircraft "A" crew actions, each of the parties' actions contributed to the risk created.

Therefore, given the above type scenario, and the need to prevent such unsafe scenarios, it is desirable for the system to monitor the aural alerts and messages from various cockpit systems, to determine the nature of the aural alert/response, to determine if a context addition can be done for the aural response, to identify the context message and tag the message to a display element, to provide symbology to output the concatenated message as an audible signal to the pilot to prevent miscommunications and subsequent risks which result of an aircraft operation.

Certain terminologies are used with a regard to the various embodiments of the present disclosure. For example, a display unit is an aircraft onboard device that provides a user interface for a particular avionic system onboard an aircraft, which may include a Flight Management System (FMS), Communications Management Function (CMF), assigned spacing goal (ASG), achieve by point (ABP), automatic dependent surveillance broadcast (ADS-B), flight information services-broadcast (FIS-B) or other avionics systems. The flight crew members may use the FMS interface to perform tasks associated with flight planning, navigation, guidance, and performance. The processor may be coupled to the display unit to format communications of data transmissions originating from one or more avionics systems onboard an aircraft, and which are directed to a cockpit display onboard the aircraft.

FIG. 1 depicts a block diagram of an exemplary aircraft navigation and control system, in accordance with the disclosed embodiments. FIG. 1 is a functional block diagram of an avionics display system 20 in accordance with an exemplary embodiment. The avionics display system 20 includes at least one processor 22 and at least one monitor 24, which is operatively coupled to processor 22. During the operation of the avionics display system 20, the processor 22 drives the graphics module 27 which, in conjunction with processor 22, drives the monitor 24 to produce a graphics display 26 that visually provides the pilot and flight crew with information pertaining to the aircraft and to neighboring aircraft within a predetermined vicinity of the host aircraft. The processor 22 includes a speech recognizer 11 and may be used to provide the functions of the speech recognizer 11. The speech recognizer 11 may convert received speech transmissions to text as well as perform appending of text and concatenating of text message with system messages. The speech recognizer 11 may perform natural language processing ("NLP") of received audio or voice transmission as well as monitoring of broadcasts and transmissions for conversion to text and further processing by the processor 22. The speech recognizer 11 may perform or assist the processor 22 in performing functions related to contextual interpretations and aggregations of the received broadcasted and transmitted voice transmissions. These transmissions may include transmissions as well as broadcasts from the ATC and aeronautical operation control ("AOC") to the aircraft or other aircrafts. The graphical display 26 may include visual representations of one or more flight characteristics pertaining to a neighboring aircraft, as described more fully below. The processor 22 may generate a graphic display 26 in a two-dimensional format (e.g., as a lateral or vertical profile map display) or in a hybrid format (e.g., in a picture-in-picture or split screen arrangement) and may be incorporated into all units capable of displaying TCAS data; e.g. the primary flight display, the multi-function display, and the interactive navigation display. The processor 22 may generate aural and audio messages to an audio output device 40 that provides the pilot and flight crew with information pertaining to the aircraft and to neighboring aircraft within a predetermined vicinity of the host aircraft. An audio capture device 42 may also be included connected into the processor 22. This audio capture device 42 may capture aural alerts from other systems of the aircraft or from pilot communications for processing by the processor 22.

The processor 22 may include, or be associated with, any suitable number of individual microprocessors, flight control computers, navigational equipment, memories, power supplies, storage devices, interface cards, and other standard components known in the art. In this respect, the processor 22 may include or cooperate with any number of software programs (e.g., avionics display programs) or instructions designed to carry out the various methods, process tasks, calculations, and control/display functions described below, for example, processor 22 may be included within a Flight Management Computer (FMC) of the type commonly deployed within a Flight Management System (FMS). The processor 22 may carry out functions associated with parsing, transcribing, aggregating and appending aural and text messages received by various inputs to the aircraft or from internal systems of the aircraft. The processor 22 with the speech recognizer 11 may include applications and solutions to perform natural language processing (NLP) process of inputs of aural alerts to convert the aural alerts to text alerts. The conversion may include aural alerts consistent in structure with the message alert for aggregating together with the message alert to form a concatenated message alert type. The NLP may be applied with context based attributes based on applications of the processor 22 with the speech recognizer 11 to determine a context of the aural alert by matching with a set of context attributes prior derived for the particular aircraft and stored locally in memory of the processor 22 or memory 55.

The image-generating devices suitable for use as monitor 24 include various analog (e.g., cathode ray tube) and digital (e.g., liquid crystal, active matrix, plasma, etc.) display devices. In certain embodiments, monitor 24 may assume the form of a Head-Down Display (HDD) or a Head-Up Display (HUD) included within an aircraft's Electronic Flight Instrument System (EFIS). The monitor 24 may be disposed at various locations throughout the cockpit. For example, the monitor 24 may include a primary flight display (PFD) and reside at a central location within the pilot's primary field-of-view. Alternatively, the monitor 24 may include a secondary flight deck display, such as an Engine Instrument and Crew Advisory System (EICAS) display, mounted at a location for convenient observation by the aircraft crew but that generally resides outside of the pilot's primary field-of-view. In still further embodiments, monitor 24 may be worn by one or more members of the flight crew.

The processor 22 includes one or more inputs operatively coupled to one or more air traffic data sources. During operation of the avionics display system 20, the air traffic data sources continually provide the processor 22 with navigational data pertaining to any neighboring aircraft. In the exemplary embodiment illustrated in FIG. 1, the air traffic data sources include a wireless transceiver 28 and a navigation system 30, which are operatively coupled to first and second inputs of processor 22, respectively. The navigation system 30 includes an on-board radar 32 and various other on-board instrumentation 34 such as a radio altimeter, a barometric altimeter, a global positioning system (GPS) unit, and the like. In a preferred embodiment, navigation system 30 may be included within a FMS; and on-board radar 32 may be included within a Terrain Awareness and Warning System (TAWS), such as an Enhanced Ground Proximity Warning System (EGPWS).

In some embodiments, graphical displays 26 may provide an output from the on-board radar 32 of the aircraft. For example, graphic displays 26 may provide a top-down view, a horizontal view, or any other view of a weather condition, an object and/or a particular terrain detected by the on-board radar 32 of the aircraft. The views of a weather condition may include monochrome or color graphical representations of the weather. A graphical representation of a weather condition may include an indication of altitude (or altitudinal coordinates) of those objects or the altitude relative to the aircraft.

The avionics display system 20 provides the display information to the pilot or flight crew in a highly intuitive manner. For this exemplary embodiment, the avionics display system 20 includes the processor 22 connected to a database 14, a flight management system 16, a navigation system 30, a graphics module 27, and a graphics display 26. Further, it is contemplated that while the avionics display system 20 appears in FIG. 1 to be arranged as an integrated system, the present disclosure is not intended to be so limited and may also include an arrangement whereby one or more of processer(s) 22, database 14, flight management system 16, navigation system 30, graphics module 27, and graphics display 26 is a separate component or a subcomponent of another system located either onboard or external to an aircraft.

Also, for example, avionics display system 20 may be arranged as an integrated system (e.g., aircraft display system, Primary Flight Display system, etc.) or a subsystem of a more comprehensive aircraft system (e.g., flight management system, navigation and control system, target aiming and control system, collision alert and/or avoidance system, weather avoidance system, etc.). Furthermore, the present disclosure is not limited to aircraft displays, and may also be implemented for other types of vehicles' electronic displays (such as, for example, spacecraft navigation displays, ship navigation displays, submarine navigation displays, train navigation displays, motor vehicle navigation displays, etc.).

The database 14 may also include, for example, a terrain database, which may include the locations and elevations of natural terrain obstacles such as mountains or other elevated ground areas, and also the locations and elevations of man-made obstacles such as radio antenna towers, buildings, bridges, etc. As another example, airport and runway location data, and other types of high priority target data (e.g., locations of incoming traffic to avoid, constructed waypoints, obstacles in the aircraft's flight path, etc.) may be retrieved and/or received by processor 22 from a suitable source of such data, such as, for example, an onboard flight management system database (e.g., a component of flight management system 16), an onboard navigation database (e.g., a component of navigation system 30), on-board sensors 36 or the on-board radar 32, or an external database (e.g., via a data communication up-link).

The aircraft may be any aviation vehicle that uses a flight management system 16 as a primary user interface for flight crew interaction with the avionics display system 20 onboard the aircraft. The aircraft may be implemented as an airplane, helicopter, spacecraft, hovercraft, or the like. The one or more avionics systems may include a Flight Management System (FMS), aircraft interface device (AID) or the like. Data obtained from the one or more avionics systems may include, without limitation: flight plan data, aircraft state data, weather data, brake system data, fuel and weights data, runway analysis data, aircraft performance data, or the like.

The memory 55 can be external to and operatively coupled to processing unit or, instead, in integrated into processer 22. In one embodiment, a processor and memory of the processer 22 reside in an Application Specific Integrated Circuit ("ASIC"). Memory 55 may store data, such as various software or firmware, supporting operation of processer 22 and other components included in avionics display system 20, such as graphics system, sensor system, and the source of aircraft state data. Additionally, the memory 55 may store one or more onboard databases or be connected to the database 14. Onboard the aircraft, the database 14 can include a navigational database, a terrain database, a weather database, a historical trend database, and/or a runway database, such as an Enhanced Ground Proximity Warning System ("EGPWS") runway database.

The processor 22 and a graphics module 27 cooperate to display, render, or otherwise convey one or more graphical representations, synthetic displays, graphical icons, visual symbology, or images associated with operation of avionics display system 20 on display device 26. An embodiment of an avionics display system 20 may utilize existing graphics processing techniques and technologies in conjunction with graphic module 27. Graphics module 27 is suitably configured to support well-known graphics technologies and display techniques including (i) synthetic vision, (ii) enhanced vision, (iii) combined vision, and (iv) compressed attitude.

Display 26 may include any image-generating device or devices capable of producing one or more navigation displays of the types described herein. As a point of emphasis, the term "display device" encompasses display devices (image-generating devices) fixed to the aircraft (A/C) cockpit, as well as Electronic Flight Bags ("EFBs") and other portable display devices that may be carried by a pilot into the cockpit of an A/C and perform the below-described functions. For example, the display 26 may implement one or more of a multi-function display (MFD), a three-dimensional MFD, a primary flight display (PFD), a synthetic vision system (SVS) display, a vertical situation display (VSD), a horizontal situation indicator (HSI), a traffic awareness and avoidance system (TAAS) display, a three-dimensional TAAS display, just to name a few. Moreover, the display may be implemented with multiple types of a display 26, each of which may implement one or more of these different, non-limiting displays. No matter the number or particular type of display that is used to implement the display 26, it was noted above that the display 26 is responsive to the image rendering display commands it receives to render various images. The images that the display 26 renders will depend, for example, on the type of display being implemented.

The display 26 may also consider input data received via user input interface device 21 when performing the above-described functions. In this regard, user input interface can include any number and type of input devices suitable for receiving pilot input, which may be distributed throughout the cockpit of an aircraft (A/C) and possibly included in other systems or subsystems. In one embodiment, user input interface assumes the form of or includes the alphanumeric keypad of an FMS.

The processor 22 is configured, upon receipt of data and information, continuously processes the information to identify the predictive tracking angle, roll, pitch, and yaw for the aircraft A/C, and to generate a symbolic form representative thereof. The symbolic form is an aircraft orientation cue to be displayed on the display 26, and the dimensions of the symbolic form vary predictably to indicate, respectively, predictive tracking angle, roll, and yaw.

Within other on-board instrumentation 34, each sensor may include one or more sensor technologies, devices, instruments (such as on-board radar, radar altimeter, a global positioning system (GPS)), and software, sufficient for detecting and providing aircraft A/C status data (including speed, location, position, remaining fuel, faults, conditions, and detected weather and temperature).

Figure 2:
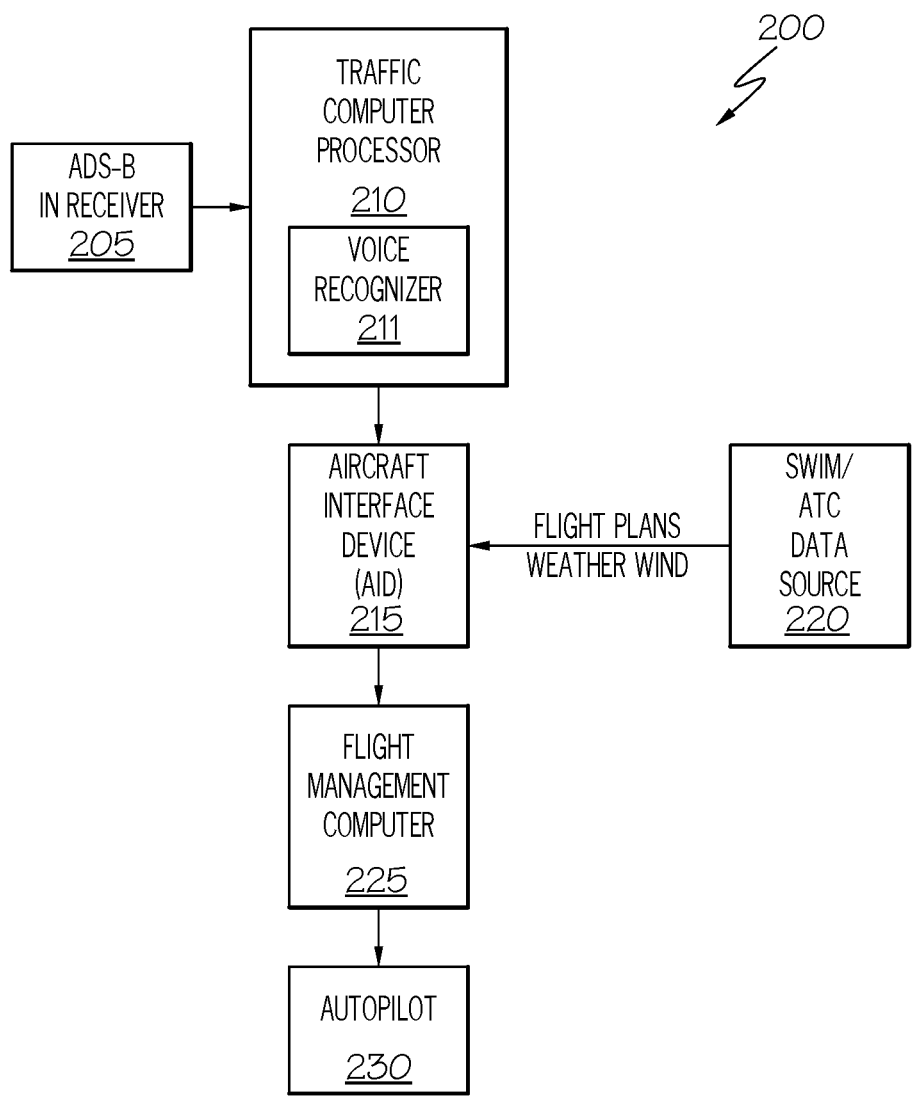
FIG. 2 is a block diagram of a system suitable for use in an aircraft in accordance with the exemplary embodiments described herein.

FIG. 2 depicts a block diagram of an exemplary aircraft navigation and control system, in accordance with the disclosed embodiments. FIG. 2 includes an automatic dependent surveillance broadcast (ADS-B) receiver 205 which is an integral component of NextGen national airspace strategy were the aircraft receives flight information services-broadcast (FIS-B) and traffic information services broadcast (TIS-B) data and other ADS-B data such as direct communication from nearby aircrafts at a traffic computer 210. The traffic computer 210 receives the ADS-B in and generates the target aircraft state parameters to an aircraft interface device (AID) 215. The traffic computer 210 may also include processors of a voice recognizer 211 and may provide voice recognize functions to convert voice transmissions to text. In addition, the voice recognizer 211 may include solutions for semantic contextual interpretations of the voice transmissions and for appending and aggregating to other text messages or flight data. For example, functions and solutions of the voice recognizer 211 together with functions and solutions of the traffic computer 210 may be used to match aural and text messages, concatenate aural and text messages, and appended or aggregate in similar or same structures pairs of aural transformed messages with text messages. Also, the AID 215 receives the flight data, weather, wind as well as inputs received from a System Wide Information Management/Air Traffic Control (SWIM/ATC) data source 220. The aircraft interface device (AID) 215 is coupled to the FMC 225 and sends speed data to the autopilot 230.

The ADS-B receiver 205 is considered an air traffic data source in that ADS-B receiver 205 receives navigational data from external control sources and relays this data to traffic computer 210. For example, ADS-B receiver 205 may receive Traffic Information Services-Broadcast (TIS-B) data from external control sources. In a preferred embodiment, the ADS-B receiver 205 receives Traffic Collision Avoidance System (TCAS) data, and may receive Automatic Dependent Surveillance-Broadcast (ADS-B) data from neighboring aircraft. This data, and other such external source data, is formatted to include air traffic information, which may be utilized to determine a neighboring aircraft's current position and the existence and location of air traffic.

In addition, the TCAS is an airborne system that detects and tracks aircraft near a host aircraft. TCAS includes a processor, antennas, a traffic display (e.g. an LMAP display, a VSD, etc.), and means for controlling the aviation display system, such as is shown in FIG. 1. The processor and antennas detect and track other aircraft by interrogating their transponders, and tracking these potential intruders on a display. The TCAS processor analyzes the transponder replies to determined range, bearing and relative altitude. If the system determines that a potential hazard exists, it issues visual and aural advisories to the crew. The visual advisory takes the form of symbols on the one or more traffic displays; e.g. the LMAP display and VSD.

Figure 3:
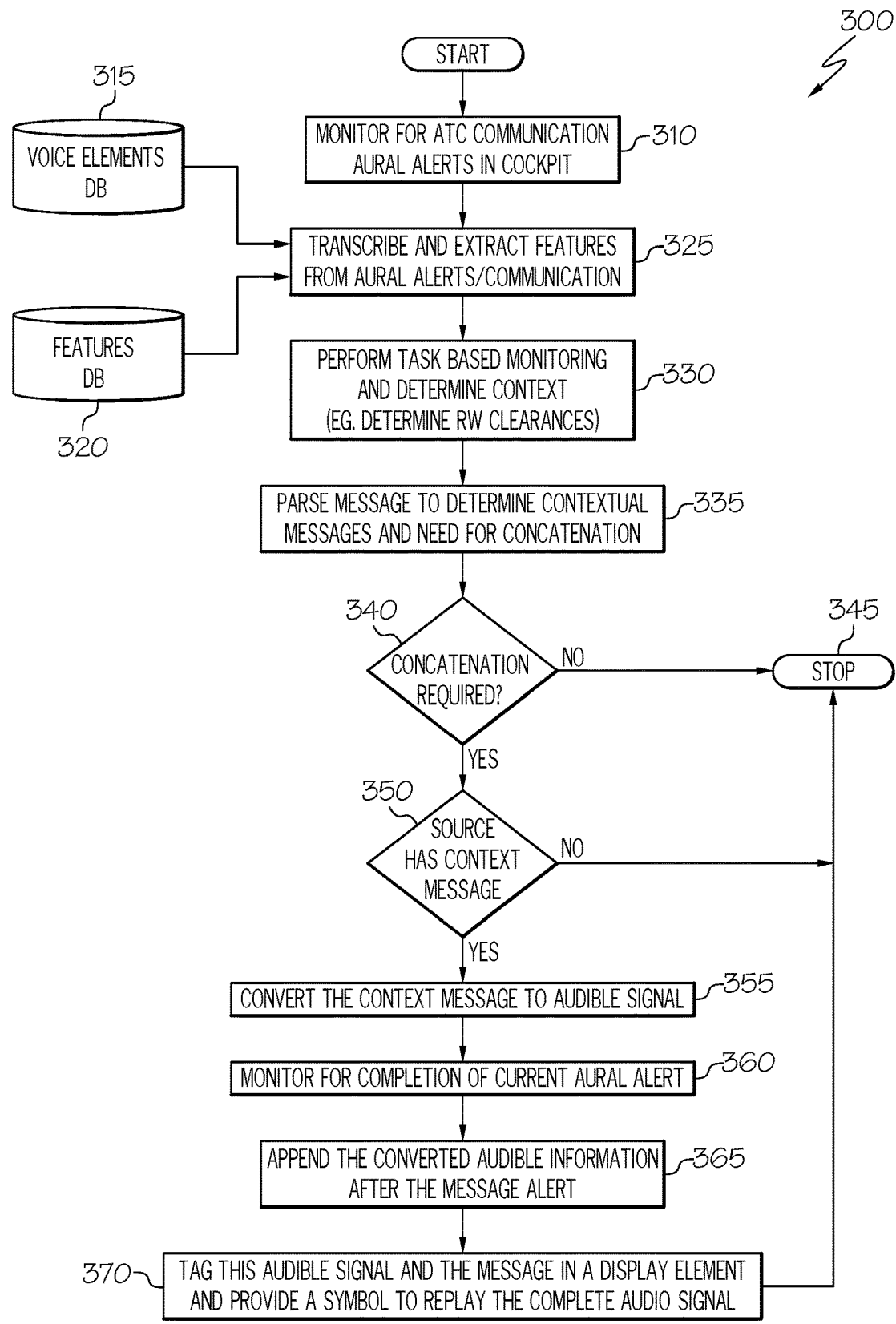
FIG. 3 is a flow diagram of an exemplary method suitable for use with the system of FIG. 1 in accordance with the exemplary embodiments

FIG. 3 discloses a flowchart for the messaging and aural alerts for the communication system of the present disclosure. In FIG. 3, the system will monitor the aural alerts and messages from various cockpit systems, determine the nature of the aural alert/response, determine if a context addition can be done for the aural response, identify the context message and tag the message to a display element. The monitored cockpit systems may include but not limited to the cockpit display systems, Flight Management Systems, EGPWS, TCAS, Weather or RADAR Systems, EFB devices, etc. Also, it is contemplated that in an Internet of Things environment many of the participating systems may be connected to each other and additional systems connected or interconnected could be easily added or removed. In addition, the system will provide symbology to output the concatenated message as an audible signal to the pilot. The context based concatenation is performed with the intention to provide more information to the pilot. The message is intuitive and sufficient enough to provide additional situational awareness to the pilot and supports him in quick decision making This system is illustrated in the flowchart of FIG. 3 where initially at task 310, the processor of the communication system monitors for air traffic control ("ATC") and air and aeronautical operational control ("AOC") communications and for aural alerts sent to the cockpit of the aircraft. That is, ATC/AOC or services may issue advisories and alerts to the pilot in the cockpit in the form of message display alerts and/or audible aural alerts on internal systems. In exemplary embodiments, some examples of such advisories or aural alerts include advisories and alerts of the following actions: the landing of an aircraft, the takeoff an aircraft, an altitude change of the aircraft and taxiway clearances for an aircraft for a particular runway etc. These advisories and aural alerts can be issued by the Air Traffic Controller (ATC) or aeronautical operational control ("AOC") using a voice channel or CPDLC uplink messages to send the communications. Additionally, emerging technologies may also allow for remotely piloted aircrafts or even techniques wherein a controller on the ground is monitoring a specific aircraft or a group of aircrafts, and in such scenarios, the relevant messages and alerts for a specific flight could be on systems remote to an airplane.

In an exemplary embodiment, these multiple systems may include SmartRunway, SmartLanding, AMM, and Synthetic Vision Systems. However, it is contemplated that there may be additional or different or lesser numbers of multiple systems and therefore the monitoring of advisories and aural alerts is not limited in number nor in nature to the multiple systems and types of systems used to generate advisories or aural alerts. In other words, in task 325, the process can transcribe and extract features from aural alerts and communications using natural language processes that are independent of the originating systems generating the aural alerts and communications. Hence, even if a particular system issues aural alerts or communications using different protocols or platforms.

Next, in FIG. 3, the system will perform the steps of intelligently concatenating the aural alerts or ATC/AOC voice transcribed data into their corresponding contextual display system messages are desired. The system will monitor the current cockpit aural messages or advisories, determine the nature of the aural messages, see if a context addition can be done, identify the context message, convert the context to an alert message and tag it to an existing display or graphical element and provide symbology to replay the alert message as an aural alert along with the concatenated message.

That is, at task 315, voice elements may be extracted from a database and features at task 320 may be received at a features database to provide taxonomy and elemental structure for the feature extraction and transcribing of the aural alerts and communications at task 325. In an exemplary embodiment, natural language processing ("NLP") may be used for processing aural alert to, for example, convert aural alerts to text. The converted text would be in the same or consistent structure of message alerts for aggregating together at a subsequently with the message alert to form a concatenated message alert type. At task 330, a task based monitoring process and a determination of the context (e.g. Determining clearances as an example) is performed. At task 335, a parsing step of the message is performed to determine the contextual message and the need or how much of a concatenation is necessary. For example, another NLP may be applied during the parsing step with context based attributes to determine a context of an aural alert by matching with a set of attributes prior derived for a particular aircraft and stored locally. At task 340, a determination is made is to determine if a concatenation is required. If none is required, the flow is stopped at task 345. Alternatively, if a concatenation is required than at task 350, a determination is made if the source has context of the message. If the determination is that there is no source which has a context of a message, then the flow stops at task 345. If a determination is made that the source has a context message, then the flow proceeds to task 355.

In an exemplary embodiment, the determination and identification may be performed by identifying the context of the concatenated message alert by applying the second NLP process to the concatenated message alert in its entirety and subsequent tagging the concatenated message alert to associate a tagged message with a display element by matching the context of the concatenated message derived by the second NLP process by a tag of the tagged message with a particular display element from a set of display elements wherein the tagged message is a concatenated message. At task 355, the context message is converted using application solutions to context message for an audible signal. At task 360, a monitoring step is performed to ascertain the completion of the current aural alert. In other words, not until the current aural alert is completed will the subsequent aural alert be issued. At task 365, the converted audible information is appended after the message alert. At task 370, the audible signal is tagged with the message in a display element and provided with a symbol on screen that is adjacent to the message alert and allows for a replay of the complete audio signal. Hence, the pilot on viewing the display, using a user interface tool can select the symbol for replaying of the complete audio signal. In addition, the monitoring step at task 360 may encompass messages alerts in the vicinity of a region of the aircraft flight by monitoring ATC/AOC communications for aural or message alerts broadcasted or transmitted in the vicinity of the aircraft which are contextually related to content of the ATC/AOC communications of the aural or messages alert which have been received by the aircraft. In addition, in the task 335 during the parsing step, a determination of the context of the aural alerts which have been broadcasted or transmitted in the vicinity of the aircraft may be performed. For example, by applying NLP processes, aural alerts which are contextually related to the aural or message alert received by the aircraft may be determined.

Figure 4:
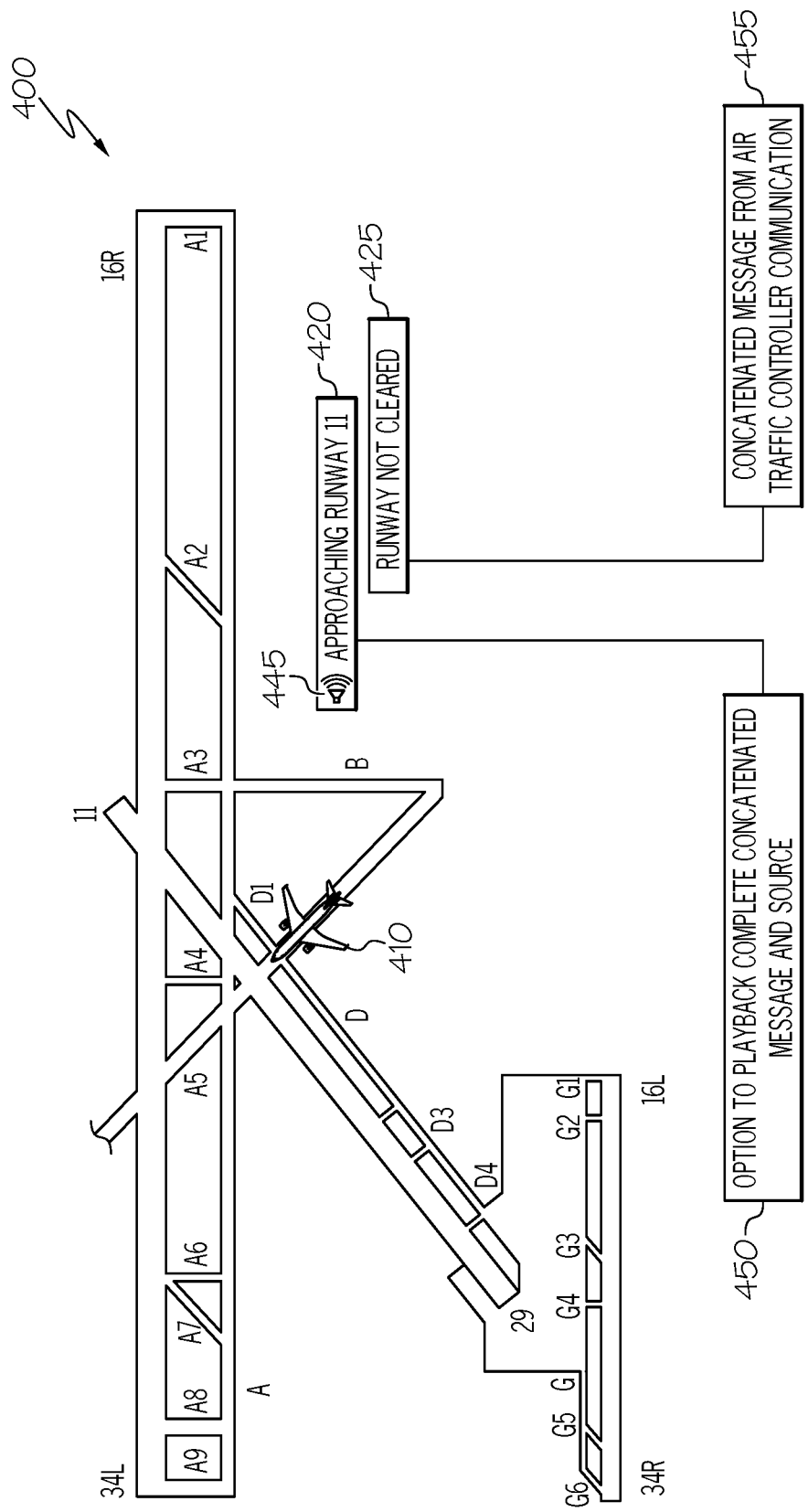
FIG. 4 is a first example of controller clearance processed by the exemplary embodiments described herein.

FIG. 4 is a first example of an ATC/AOC clearance processed by the exemplary embodiments described herein. FIG. 4 illustrates a use scenario 400 of a concatenation of a message on a SmartRunway system to reduce runway incursions. For example, the Runway Awareness and Advisory System ("RAAS") determines that the aircraft 410 is approaching Runway 11 at 415 on a path 405 for takeoff or crossing. However, the Runway 11 has already been cleared by the controller for another aircraft (not shown) for landing by the controller. The system has been monitoring all the relevant ATC/AOC, ground controller, internal and external communications and will therefore determine that Runway 11 is unsafe for crossing. When RAAS issues an "Approaching Runway 11" message 425, the system will determine the relevant message that can be concatenated with to an "Approaching Runaway 11" message 420 on the display system. In this case, the system polls the clearance monitoring system and identifies, a "RUNWAY NOT CLEARED" message 425 to be appended based on context. That is, the "RUNWAY NOT CLEARED" message is a concatenated message from the ATC controller communication 455 which is determined by the system to be contextually relevant to the aircraft 410 operation of approaching runway 11. As soon as the "Approaching Runway 11" message 420 annunciation is complete, the system will in continuation announce a "RUNWAY NOT CLEARED" alert message along with the "approaching runway 11" message. Hence, the message announced will be a two-part message concatenated together of a first part of the "approaching runway 11" message 420 and the second part of the "RUNWAY NOT CLEARED" message 425. Both parts of the message will be seamlessly announced together. Additionally, both the messages appended together of the "Approaching Runway 11, RUNWAY NOT CLEARED" message is tagged to an Airport Moving Map (AMM) Display element with a symbology 445 to review and rehear the concatenated message. Hence, an option 450 to playback the complete concatenated message and source is available to the pilot on selection.

Figure 5:
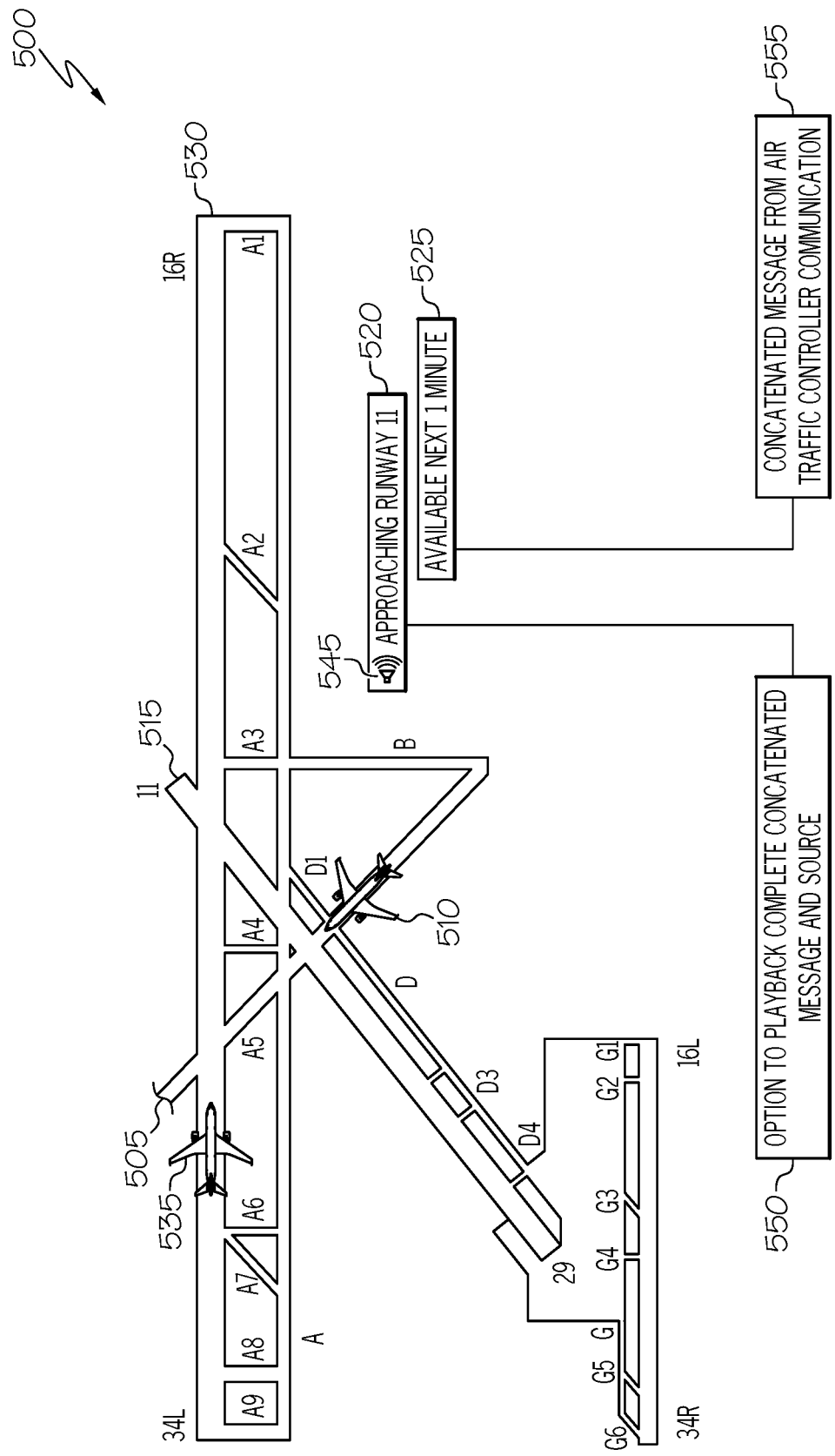
FIG. 5 is a second example of a controller clearance processed by the exemplary embodiments described herein.

FIG. 5 is a second example of an ATC clearance processed by the exemplary embodiments described herein. FIG. 5 illustrates a use scenario 500 of a concatenation of a message on a SmartRunway system to reduce runway conflicts. For example, when the RAAS determines that the aircraft 510 is approaching Runway 11 for takeoff or crossing. However, Runway 11 is also partly used as a taxi path and has been cleared by the controller for another aircraft 505 which has just landed on the runway designated as RW16R labeled 530. The system monitors the ATC communication and receives the taxi path of the traffic of interest or relevant to the operation of the aircraft 510 and in this case, determines that Runway 11 labeled as 515 is either safe for crossing or takeoff but only for the next 2 minutes. When RAAS issues an "Approaching Runway 11" message, the system determines that this relevant message "Approaching Runway 11" can be concatenated 555 with an "Approaching Runaway 11" message 520 on the display system. In this case, the system polls the clearance monitoring system and identifies the "AVAILABLE NEXT 1 MINUTE" message 525 to be appended based on context with the "Approaching Runway 11" message 520. As soon as "Approaching Runway 11" message annunciation is complete, the system will in a continuous uninterrupted operational manner announce an alert of an "AVAILABLE NEXT 1 MINUTE" message 525 along with displaying the alert message. Additionally, the aggregate message of both parts of "Approaching Runway 11, AVAILABLE NEXT 1 MINUTE" message is tagged to the Airport Moving Map (AMM) display element with a symbology 545 to review and rehear the concatenated message. Hence, an option 550 to playback the complete concatenated message and source is available to the pilot on selection.

Figure 6:
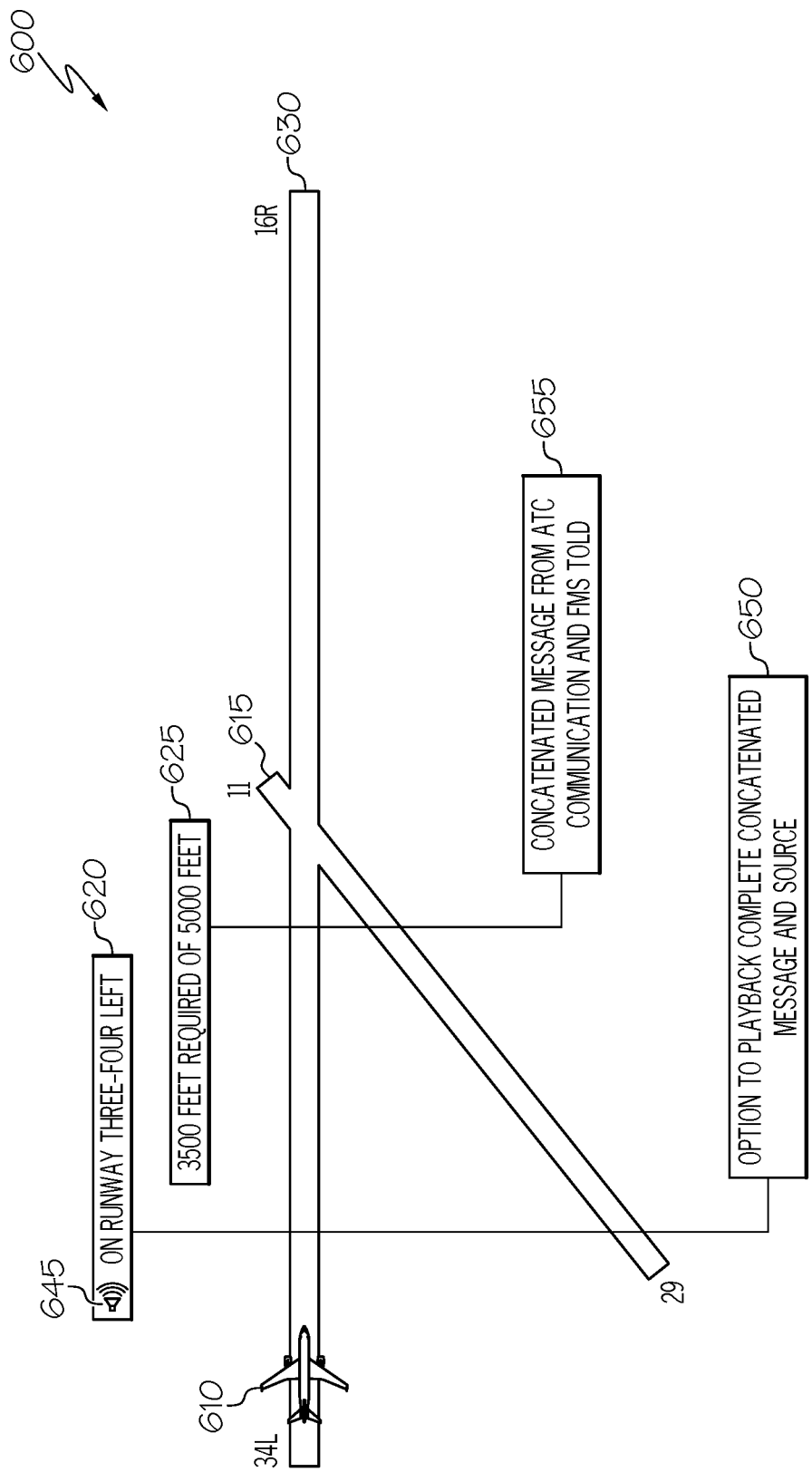
FIG. 6 is a third example of a controller clearance processed by the exemplary embodiments described herein.

FIG. 6 is a third example of an ATC clearance processed by the exemplary embodiments described herein. FIG. 6 illustrates a use scenario 600 of a concatenation of a message on a SmartRunway system for lift off distance. For example, when, the RAAS determines that the aircraft 610 is aligned on Runway Three-Four Left (labeled as runway 630) for takeoff. A system which monitors the FMS Takeoff and Landing Data ("TOLD") messages and Airport Declared Runway distance can determine if the available runway length is sufficient for a safe takeoff. When the RAAS issues the "On Runway three-four left" message, the system will determine the relevant message that can be concatenated 655 with the "On Runway three-four left" message 620 on the display system. In this case, the system polls the clearance TOLD and airport system and identifies, "3500 FEET REQUIRED OF 6000 FEET" message 625 to be appended based on context. As soon as the "On Runway Three-Four Left" message 620 annunciations are complete, the proposed system will in continuation announce an alert of the "3500 FEET REQUIRED OF 6000 FEET" message 620 along with the "On Runway Three-Four Left". Additionally, the "On Runway Three-Four Left, 3500 FEET REQUIRED OF 6000 FEET" message is tagged to the Airport Moving Map (AMM) Display element with a symbology 645 to review and rehear the concatenated message. Hence, an option 650 to playback the complete concatenated message and source is available to the pilot on selection.

Figure 7:
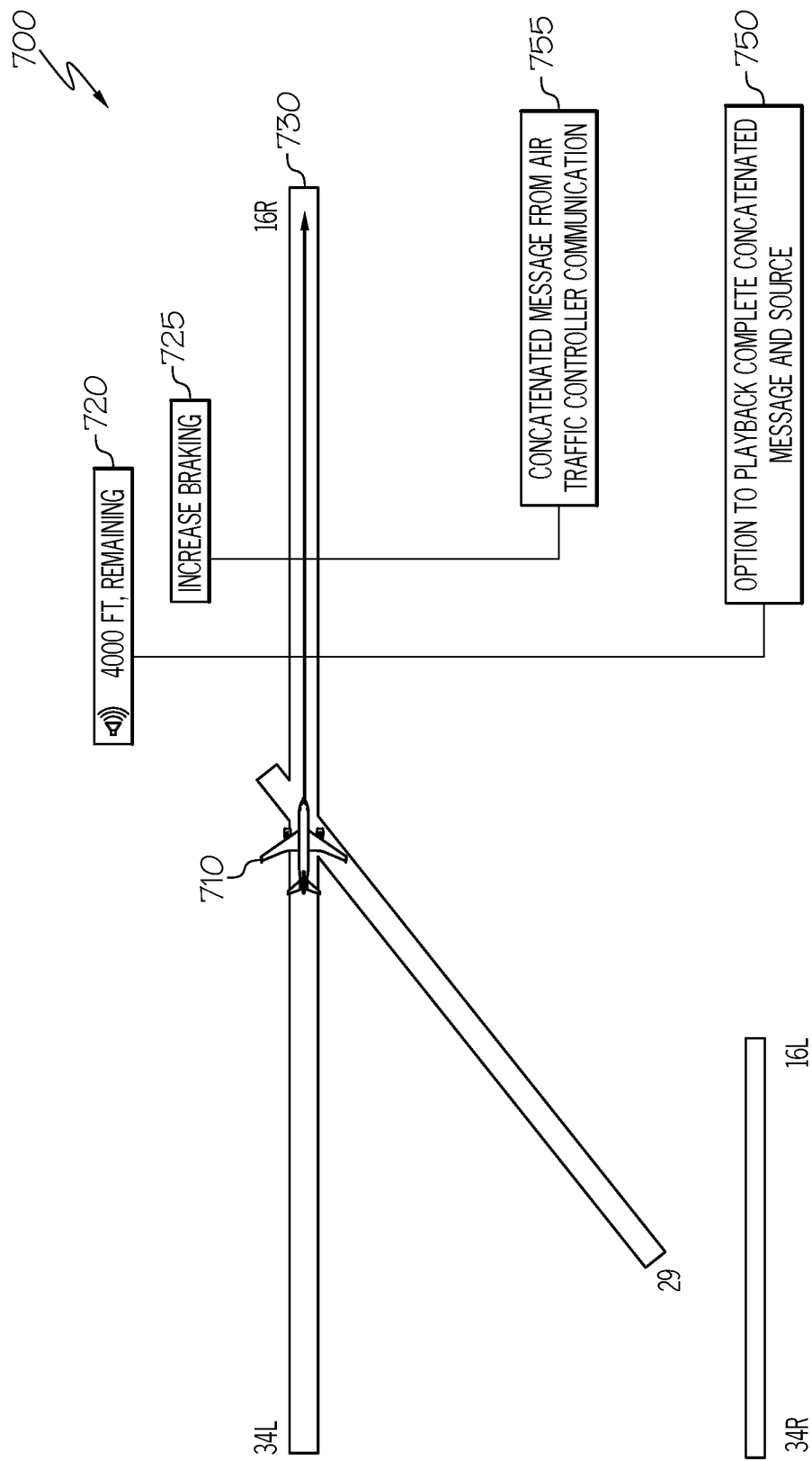
FIG. 7 is a fourth example of a controller clearance processed by the exemplary embodiments described herein.

FIG. 7 is a fourth example of an ATC clearance processed by the exemplary embodiments described herein. FIG. 7 illustrates a use scenario 700 of a concatenation of a message on a SmartRunway system for braking distance. When an aircraft 710 is landing, a system determines that the runway 730 is wet and braking is not sufficient and appends a message 720 to increase braking after 4000 ft message 725 is heard and provides an indication in the displays along with a symbol to play that message.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality.

Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of monitoring aural and message alerts received during flight in an internet of things (IOT) cockpit of an aircraft generated by systems within the cockpit, the method comprising:

receiving a plurality of alerts which comprise at least one of an aural alert or message alert wherein the aural and message alerts are from communications comprising: internal systems of the aircraft, air traffic control (ATC) communications, and internal and external communications of the aircraft;

applying a first natural language processing (NLP) process to the aural alert to convert the aural alert to a text alert consistent in structure with the message alert for aggregating together with the message alert to form a concatenated message alert wherein the NLP is applied with context based attributes to determine at least a context of the aural alert by matching with a set of context attributes prior derived for the particular aircraft and stored locally therein; and identifying the context of the concatenated message alert by applying a second NLP process to the concatenated message alert in its entirety and subsequent tagging the concatenated message alert to associate a tagged message with a display element by matching the context of the concatenated message derived by the second NLP process by a tag of the tagged message with a particular display element from a plurality of display elements wherein the tagged message is a concatenated message.

2. The method of claim 1, further comprising:
enabling a playback of the message by selection of the particular display element for executing a playback operation by a user wherein the playback operation is of the concatenated message in place of a non-concatenated original message.

3. The method of claim 1, wherein the particular display element is located adjacent to a display of the tagged message.

4. The method of claim 1, further comprising:
monitoring the communications for aural or message alerts related in context to the communications of the aural or messages alerts received by the aircraft wherein the aural or message alerts may be indirectly sent to the aircraft, and aggregating the aural or message alerts received by the aircraft in accordance with determinations of the monitored indirectly sent aural or message alerts for displaying to a user on the display.

5. The method of claim 1, further comprising:
monitoring the communications for aural or message alerts broadcasted, transmitted, or sent via a datalink in a region in the vicinity of the aircraft which are contextually related to content of the communications of the aural or message alert which have been received by the aircraft.

6. The method of claim 5 further comprising:
determining the context of the aural alerts which have been broadcasted, transmitted or sent via a datalink in a region in the vicinity of the aircraft by applying NLP processes to determine aural alerts which are contextually related to the aural or message alert received by the aircraft.

7. The method of claim 6, further comprising:
concatenating the aural or message alerts received by the aircraft in accordance with determinations of the context of the contextually related aural or message alerts broadcasted, transmitted or sent via datalink in the region in the vicinity of the aircraft.

8. The method of claim 7, further comprising:
appending the aural or message alerts received by the aircraft in accordance with determinations of the contextually related aural or message alerts broadcasted, transmitted or sent via datalink in the region in the vicinity of the aircraft.

9. A cockpit display system for use onboard an aircraft, the cockpit display system comprising:
a source of sensatory and message alerts;
a processor, communicatively coupled the source of sensatory and message alerts, and a cockpit display, the processor configured to process the sensatory and message alerts to:
receive a plurality of alerts which comprise at least one of a sensatory alert or message alert wherein the sensatory and message alerts are either from internal systems of the aircraft, from internal communications, or from external communications;
apply a first natural language processing (NLP) process to the sensatory alert to convert the sensatory alert to a text alert consistent in structure with the message alert for aggregating together with the message alert to form a concatenated message alert wherein the NLP is applied with context based attributes to determine at least a context of the sensatory alert by matching with a set of context attributes prior derived for the particular aircraft and stored locally therein; and
determine the context of the concatenated message alert by applying a second NLP process to the concatenated message alert in its entirety and subsequent tagging the concatenated message alert to associate a tagged message with a display element by matching the context of the concatenated message derived by the second NLP process by a tag of the tagged message with a particular display element from a plurality of display elements wherein the tagged message is a concatenated message.

10. The display system of claim 9, further comprising:
the processor further configured to:
enable a playback of the message by selection of the particular display element to execute a playback operation by a user wherein the playback operation is of the concatenated message in place of a non-concatenated original message.

11. The display system of claim 9, wherein the particular display element is located adjacent to a display of the tagged message.

12. The display system of claim 9, further comprising:
the processor further configured to:
monitor internal and external communications for sensatory or message alerts related in context to the internal and external communications of the sensatory or message alerts received by the aircraft wherein the sensatory or message alerts may be indirectly sent to the aircraft, and
aggregate the sensatory or message alerts received by the aircraft in accordance with determinations of the monitored indirectly sent sensatory or message alerts for displaying to the user on the display.

13. The display system of claim 9, further comprising:
the processor further configured to:
monitor internal or external communications for sensatory or message alerts broadcasted or transmitted in the vicinity of the aircraft which are contextually related to content of the internal or external communications of the sensatory or message alert which have been received by the aircraft.

14. The display system of claim 9 further comprising:
the processor configured to:
determine the context of the sensatory alerts which have been broadcasted or transmitted in the vicinity of the aircraft by applying NLP processes to determine sensatory alerts which are contextually related to the sensatory or message alerts received by the aircraft.

15. The display system of claim 14, further comprising:
the processor configured to:
concatenate the sensatory or messages alert received by the aircraft in accordance with determinations of the context of the contextually related sensatory or message alerts broadcasted or transmitted in the vicinity of the aircraft.

16. The display system of claim 15, further comprising:
the processor configured to:
append the sensatory or message alerts received by the aircraft in accordance with determinations of the contextually related sensatory or message alerts broadcasted or transmitted in the vicinity of the aircraft.

17. A method for presenting information on a display system for use onboard an aircraft, the method comprising:
receiving, from a source of aircraft flight alerts; and
at a processor, communicatively coupled the source of aircraft flight alerts, and a display device, the processor configured to process aircraft flight alerts to receive a plurality of flight alerts which comprise at least one of a set of an aural alert, an annunciation alert, or a message alert wherein aural, annunciation and message alerts are either from internal systems of the aircraft, from internal communications or from external communications, the processor further comprising a speech recognition processor to:
apply a first natural language processing (NLP) process to the aural alert to convert the aural alert or annunciation alert to a text alert consistent in structure with the message alert for aggregating together with the message alert to form a concatenated message alert wherein the NLP is applied with context based attributes to determine at least a context of the aural or annunciation alert by matching with a set of context attributes prior derived for the particular aircraft and stored locally therein; and
to determine the context of the concatenated message alert by applying a second NLP process to the concatenated message alert and subsequent tagging the concatenated message alert to associate a tagged message with a display element by matching the context of the concatenated message derived by the second NLP process by a tag of the tagged message with a particular display element from a plurality of display elements wherein the tagged message is a concatenated message.

18. The method of claim 17, further comprising:
the processor configured to:
   monitor the communications for aural or message alerts related in context to the communications of the aural or messages alerts received by the aircraft wherein the aural or message alerts may be indirectly sent to the aircraft, and
   aggregate the aural or message alerts received by the aircraft in accordance with determinations of the monitored indirectly sent aural or message alerts for displaying to a user on the display.

19. The method of claim 18, further comprising:
the speech recognition processor further configured to:
   monitor communications for aural, annunciation or message alerts broadcasted or transmitted in a region in a vicinity of the aircraft which are contextually related to content of the communications of the aural, annunciation or messages alert which have been received by the aircraft.

20. The method of claim 19, further comprising:
the speech recognition processor further configured to:
   determine the context of the aural alerts which have been broadcasted or transmitted in the region in a vicinity of the aircraft by applying NLP processes to determine aural and annunciation alerts which are contextually related to the aural, annunciation or message alerts received by the aircraft, and
   concatenate the aural, annunciation or messages alerts received by the aircraft in accordance with determinations of the context of the contextually related aural, annunciation or message alerts broadcasted or transmitted in the region in the vicinity of the aircraft.

* * * * *